United States Patent [19]
DeYoreo

[11] Patent Number: 4,523,404
[45] Date of Patent: Jun. 18, 1985

[54] INSECT KILLING DEVICE WITH REMOVABLE ELECTRICALLY CONDUCTIVE GRID

[75] Inventor: Sal G. DeYoreo, Andover, Mass.

[73] Assignee: Armatron International, Inc., Melrose, Mass.

[21] Appl. No.: 523,002

[22] Filed: Aug. 15, 1983

[51] Int. Cl.³ .......................... A01M 1/04; A01M 1/22
[52] U.S. Cl. .......................................... 43/112; 43/113
[58] Field of Search .................... 43/112, 113, 98, 132

[56] References Cited

U.S. PATENT DOCUMENTS

| | | | |
|---|---|---|---|
| 1,848,614 | 3/1932 | Folmer et al. | 43/112 |
| 1,852,923 | 4/1932 | Folmer et al. | 43/112 |
| 3,473,251 | 10/1969 | Kahn | 43/112 |
| 3,823,506 | 7/1974 | Iannini | 43/112 |
| 3,835,577 | 9/1974 | Soulos | 43/112 |
| 3,986,292 | 10/1976 | Klebanoff | 43/112 |
| 4,121,371 | 10/1978 | Kaphengst et al. | 43/112 |
| 4,182,069 | 1/1980 | De Yoreo | 43/112 |
| 4,226,043 | 10/1980 | Peterson | 43/112 |

FOREIGN PATENT DOCUMENTS 2708079 9/1978 Fed. Rep. of Germany ........ 43/112

Primary Examiner—Nicholas P. Godici
Assistant Examiner—Kurt Rowan
Attorney, Agent, or Firm—Maurice E. Gauthier

[57] ABSTRACT

An insect killing device has an electrically powered light source surrounded by an electrically conductive grid, the light source and grid being enclosed within a dielectric housing having a side wall which is closed at its upper end by an impervious top and which defines an open port at its lower end. The light source and the grid are energizable by an electric AC power source external to the housing via electric circuit components located in the housing. The side wall has an array of openings through which insects attracted by the energized light source may pass to come into contact with and be electrocuted by the energized grid. The grid is supported on a dielectric carrier and is separably connected to the electric circuit components. The grid and the carrier are removable as a unit from the housing through its port, with the dimensions of the grid and carrier in relation to the dimensions of the housing side wall being such that the grid is disconnected from the circuit components and thus de-energized prior to its being withdrawn from the housing.

8 Claims, 5 Drawing Figures

INSECT KILLING DEVICE WITH REMOVABLE ELECTRICALLY CONDUCTIVE GRID

BACKGROUND OF THE INVENTION

1. Field of the Invention

This invention relates to insect killing devices of the type having an electrically powered light source for attracting insects into contact with an electrically charged grid, the light source and grid being enclosed by a protective dielectric housing.

2. Description of the Prior Art

Insect killing devices of the type referred to above are now well known and in widespread use. The voltages applied to the killing grids varies widely from model to model. The less expensive units commonly utilize lower voltages, and this presents a problem in that the insects are not disintegrated upon contact with the killing grids. Instead, the insects remain stuck to the grid, and in a relatively short time, the units become clogged and inoperable. This condition must be corrected by brushing or otherwise cleaning the grids. With conventional insect killing devices, because the grids are not readily removable, this is a difficult and time consuming task.

SUMMARY OF THE INVENTION

A major objective of the present invention is to facilitate the cleaning of the killing grid by making it easily removable from the remainder of the unit. A companion objective of the present invention is to provide means for disconnecting the grid from its power source prior to the grid being extracted from the protective dielectric housing.

In a preferred embodiment of the present invention to be described hereinafter in greater detail, these objectives are achieved by supporting the grid on a dielectric carrier. The grid and carrier are removable as a unit from the protective dielectric housing through an appropriately located lower port which is closed by a removable bottom member during normal operation of the unit. The dimensions of the grid and carrier in relation to the dimensions of the housing are such that the grid is disconnected from its power source and thus completely de-energized prior to its being extracted from the housing.

DETAILED DESCRIPTION OF PREFERRED EMBODIMENT

Figure 1:
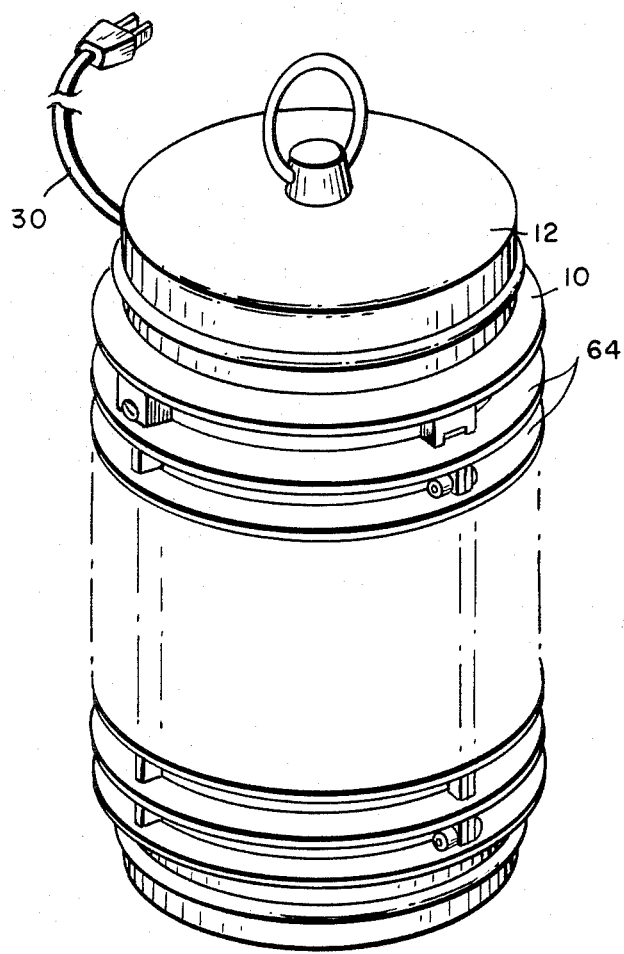
FIG. 1 is a view in perspective of an insect killing device in accordance with the present invention.

Referring now to the drawings, an insect killing device is shown comprising a dielectric outer housing having a generally cylindrical side wall 10 which is closed at its upper end by an impervious somewhat dome-shaped top 12, and which defines an opening or port 14 at its lower end. The housing is internally subdivided by a horizontal shelf 16 into upper and lower chambers 18, 20.

An electrically powered light source 22, such as for example a U-shaped UV light bulb, is centrally located in the lower chamber 20. The light source has conventional prongs 24 which plug into a socket 26 on the underside of shelf 16. The socket 26 in turn is connected by conventional means (not shown) to electric circuit components generally indicated at 28 which are located in the upper chamber 18. The circuit components 28 in turn are connected to a conventional cord 30 which may be plugged into any available AC electric power source (not shown) external to the housing.

The circuit components 28 include a voltage augmenting transformer having contacts 32 overlying two of the openings defined by four tubular bosses 34 depending from the shelf 16. The light source 22 is surrounded by an electrically conductive grid 36. The grid is supported on a dielectric carrier having a circular bottom 38 with a centrally located relatively large diameter tubular boss 40 surrounded by four smaller diameter upstanding bosses 42 supporting vertical carrier posts 44. The grid essentially consists of an exposed wire wound around the posts 44, with the ends of the wire being connected to metal spring contacts 46 carried on the upper ends of two of the posts 44.

Figure 4:
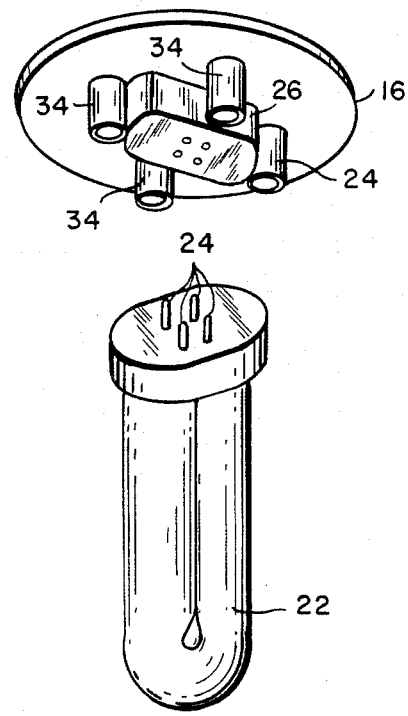
FIG. 4 is an exploded perspective view showing the underside of the internal housing shelf, the light source, the unit consisting of the grid and carrier, and the bottom cover member.
Figure 4:
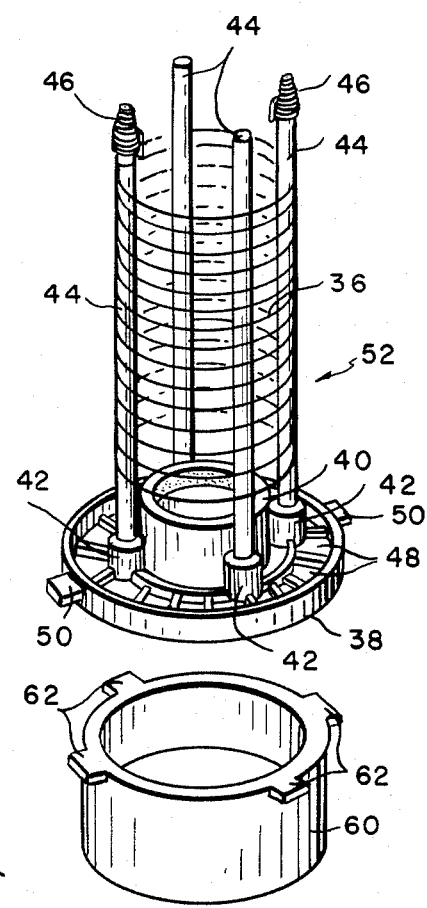

The carrier bottom 38 has a plurality of openings 48, and a pair of laterally extending mounting tabs 50. The carrier bottom 38 and posts 44 are dielectric, and together with the grid 36, form an integral unit generally indicated at 52 in FIG. 4.

Figure 5:
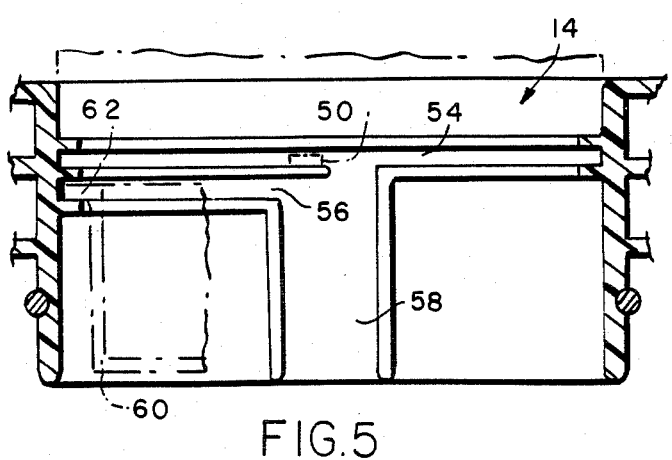
FIG. 5 is a sectional view taken through the lower end of the housing.

The lower housing port 14 is large enough to accommodate passage therethrough of the unit 52 as well as the light source 22. Vertically spaced locking slots 54, 56 are formed on the interior of the housing wall 10 below the port 14. Four vertical access slots 58 also are formed on the interior of the housing wall (only one of which is shown in FIG. 5). All four of the access slots 58 communicate with the lowermost locking slot 56, and two of the access slots additionally communicate with the uppermost locking slot 54.

Figure 2:
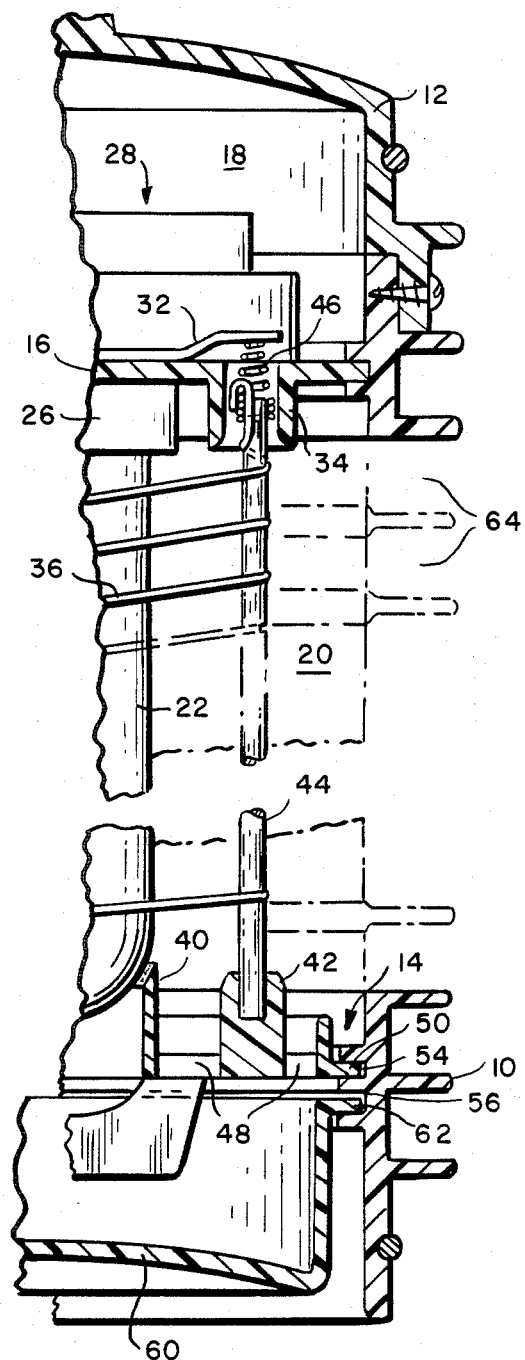
FIG. 2 is a partial sectional view on an enlarged scale, taken along line 2—2 of FIG. 1.
Figure 3:
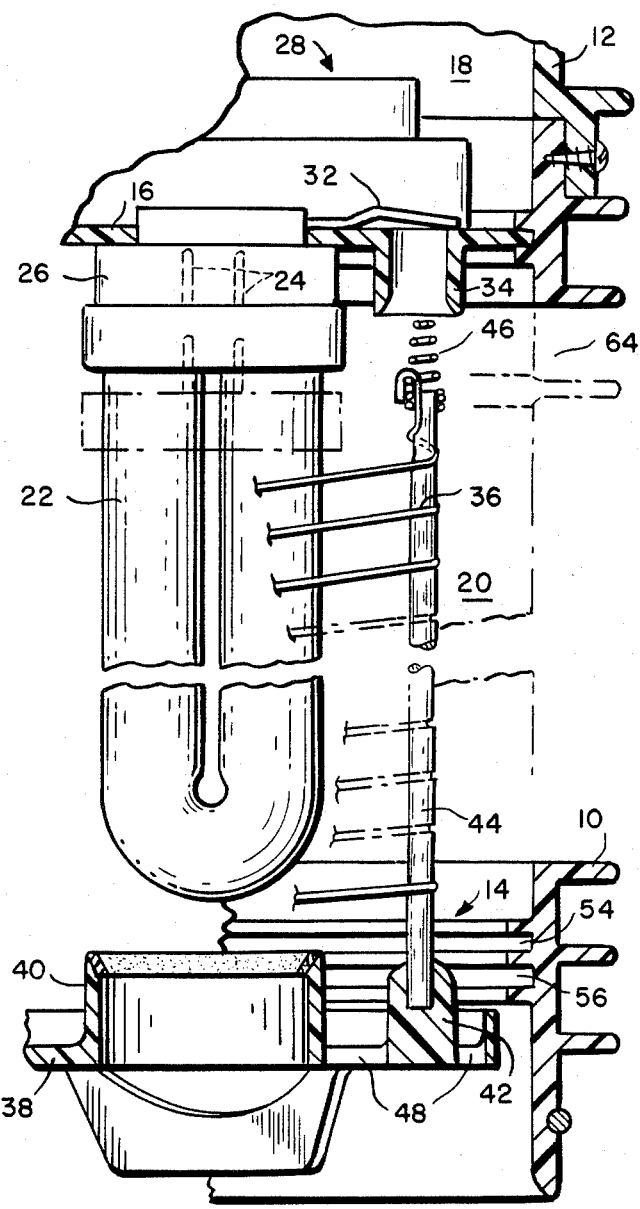
FIG. 3 is a view similar to FIG. 2, but showing the bottom cover member removed and the unit consisting of the grid and carrier in the process of being extracted from the housing.
Figure 3:
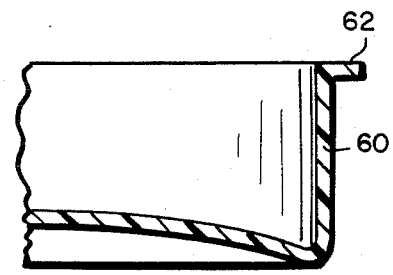

During initial assembly, the light source 22 is first passed upwardly through the port 14, and its prongs 24 are plugged into the socket 26 to establish an electrical connection with the circuit components 28. Next, the unit 52 is passed upwardly through the port 14, with the mounting tabs 50 passing upwardly through two of the access slots 58, with all four posts 44 being in alignment with the bosses 34, and with the spring contacts 46 aligned with the bosses associated with the transformer contacts 32. The dimensions of the grid and carrier making up unit 52 in relation to the dimensions of the housing side wall 10 are such that, as can best be seen in FIG. 3, the grid 36 will have passed fully through the port 14 into the housing chamber 20 prior to the spring contacts 46 coming into engagement with the transformer contacts 32. At this point, only the carrier's dielectric bottom 38 is exposed. Thus, the user is safeguarded from dangerous exposure to the grid in the event that the unit 52 is being handled while the cord 30 is plugged into a power outlet. After the spring contacts 46 have entered the bosses 34 and have engaged the transformer contacts 32, and the mounting tabs 50 have arrived in horizontal alignment with locking slot 54, the unit 52 is twisted slightly to move the tabs 50 into the locking slot 54, thus detachably securing the unit to the housing side wall 10. The resiliency of the spring contacts 46 will accommodate any such twisting. When the unit 52 is in place as shown in FIG. 2, the lower end of the light source 22 will be received in and supported by the central carrier boss 40, thus preventing the light source from accidentally becoming unplugged from socket 26.

A cup-shaped bottom member 60 is then placed in position to close off the lower end of the housing. The bottom member has mounting tabs 62 arranged to vertically enter the lower locking slot 56 via the access slots 58.

The housing side wall 10 is provided with an array of openings 64 through which insects attracted by the energized light source 22 may pass to come into contact with and be electrocuted by the energized grid 36. Insects that drop from the grid will pass through the openings 48 in the carrier base 38 for collection in the cup-shaped bottom 60.

As previously indicated, during operation of the device, there is a possibility that insects will become stuck on the grid 36, and eventually, if the unit is to remain effective, these insects will have to be dislodged and removed. When this becomes necessary, the bottom 60 is first removed. Then, the dielectric carrier bottom 38 is grasped, twisted to align the tabs 50 with access slots 58, and then pulled downwardly out of the housing. Preferably, this operation is preceded by an unplugging of the power cord 30. However, even if the user forgets to take this precautionary preliminary step, he or she will be safeguarded from danger because the spring contacts 46 will become separated from the transformer contacts 32 before the lower end of the grid 36 passes through the port 14. After the unit 52 has been removed from the housing, it can be conveniently brushed, washed, etc. At this time, the light source 22 is fully accessible, and it too can be easily removed through the port 14 for cleaning or replacement. The light source 22, the unit 52 consisting of the grid and its carrier, and the bottom 60 then can be replaced and the device put back into operation.

In light of the foregoing description, it will now be evidence to those skilled in the art that changes and modifications may be made to the disclosed embodiment without departing from the spirit and scope of the invention as defined by the claims appended hereto. For example, the device need not be cylindrical, and in fact can take on any desired shape. The manner of separably connecting the grid 36 and light source 22 to the circuit components 28 can be changed to any one of a number of known alternatives. The design of the grid 36 and the dielectric carrier, as well as the type and number of light sources, also can be varied to suit various requirements.

I claim:

1. In an insect killing device of the type having an electrically powered light source surrounded by an electrically conductive grid, the said light source and grid being enclosed within a housing having a side wall surrounding said grid, said side wall being closed at its upper end by a top and defining an open port at its lower end, said light source and said grid being energizable by an electric AC power source external to said housing via electric circuit components located in said housing, said side wall having an array of openings through which insects attracted by said energized light source may pass to come into contact with and be electrocuted by said energized grid, the improvement comprising: said grid being supported on a dielectric carrier and being separably connected to said electric circuit components, said carrier having a dielectric bottom portion dimensioned and arranged to enter said port and to block access to said grid through said port when said grid is energized, said grid and said carrier being removable as a unit from said housing through said port, with the arrangement of said grid and the bottom portion of said carrier in relation to that of said side wall and said port being such that said grid is disconnected from said circuit components and thus de-energized prior to said port being unblocked by removal of said bottom portion therefrom.

2. The device of claim 1 wherein said carrier is detachably secured to said side wall.

3. The device of claims 1 or 2 wherein the bottom portion of said carrier is provided with openings through which dead insects may fall, and wherein said port is additionally closed by a cup-shaped bottom member underlying said bottom portion and detachably secured to said side wall.

4. The device of claim 1 wherein said housing is internally subdivided by a shelf into upper and lower chambers, said electric circuit components being located in said upper chamber and said grid, carrier and light source being located in said lower chamber.

5. The device of claim 4 further comprising means extending through said shelf for separably connecting said grid to said electric circuit components.

6. The device of claim 1 wherein said light source is separably connected to said electric circuit components, said light source being removable from said housing through said port following removal of said grid and carrier.

7. The device of claim 4 wherein said light source is separably connected to said electric circuit components by means of a socket located on the underside of said shelf, said carrier being detachably secured to said side wall and being engageable with said light source to maintain the same in engagement with said socket.

8. In an insect killing device of the type having an electrically powered light source surrounded by an electrically conductive grid, the said light source and grid being enclosed within a housing having a side wall surrounding and spaced outwardly from said grid, said side wall being closed at its upper end by an impervious top and defining an open port at its lower end, said light source and said grid being energizable by an electric AC power source external to said housing via electric circuit components located in said housing, said side wall having an array of openings through which insects attracted by said enrgized light source may pass to come into contact with and be electrocuted by said energized grid, the improvement comprising: said grid being supported on a dielectric carrier, said carrier having a dieletric bottom portion dimensioned and arranged to enter said port and to block access to said grid through said port when said grid is energized, a shelf internally subdividing said housing into upper and lower chambers, said electric circuit components being located in said upper chamber and said grid, carrier and light source being located in said lower chamber, first means extending through said shelf for separably connecting said grid to said electric circuit components, second means for separably connecting said light source to said electric circuit components, said grid and carrier being removable as a unit from said housing through said port, with the arrangement of said grid and the bottom portion of said carrier in relation to that of said side wall and said port being such that said grid is separated from said circuit components and thus is de-energized prior to said port being unblocked by removal of said bottom portion therefrom, said light source also being removable from said housing through said port following removal of said grid and carrier.

* * * * *